3,079,489
SIGMA WELDING CONTROLS
Roscoe R. Lobosco, Fanwood, and Edward J. Ruland, Jr., West Caldwell, N.J., assignors to Union Carbide Corporation, a corporation of New York
Filed May 23, 1960, Ser. No. 30,973
4 Claims. (Cl. 219—130)

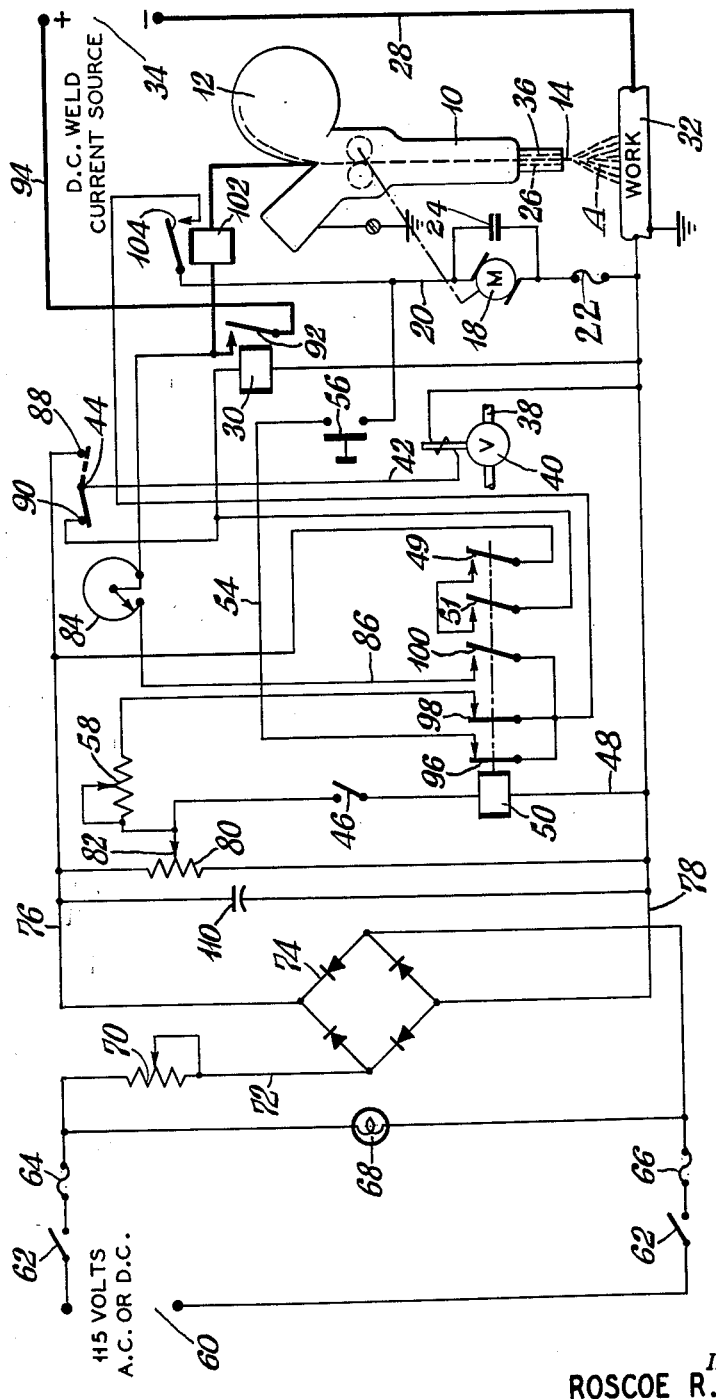

This invention relates to sigma (shielded-inert-gas-metal-arc) welding controls, and more particularly to improvements in circuit means rendering the controls suitable for D.C. as well as A.C. sources of supply.

Prior controls require a 115 volt A.C., 60 cycle, power source in order to operate. Some commercial and military applications, however, having 115 volt D.C. power source available rather than 115 volt A.C. Consequently, it is an object of the invention to provide a control capable of effectively operating from a 115 volt D.C. power source.

Most engine driven generators have an available power source of 115 D.C. and, as a result, cannot be used to provide the power to an A.C. control. Such engine driven generators are highly portable and used frequently for field erection work (pipeline, oil riggers, on-site tank fabrication, etc.) and wherever portability is required.

Therefore, to meet present operating requirements, a portable sigma voltage control capable of functioning with such engine driven generators is desirable. Naturally this control had to be so constructed as to be able to operate with any 115 volt D.C. power source available. However, in doing so, the existing simplicity, ruggedness, and performance of the existing control for A.C. is retained by the present invention.

While actually welding, the wire feed motor is connected across the arc in series with a rheostat. The rheostat is used to provide the required adjustment as will be explained later. Since the motors are preferably rated for approximately 24 volts D.C. operation, the arc circuit provides the required power for the motor while welding. When inching the wire to load a new spool of wire or to get the proper wire extension, the power must be obtained from the power source feeding the control. This voltage is too high for the motor. Therefore, means for supplying reduced voltage for the motor is provided.

The small weld start and inching switches usually located in the torch are not capable of interrupting 115 volts D.C. Furthermore, for safety reasons it is not desirable to bring this high voltage into the torch. Therefore, a suitably low voltage source of power is also provided for this circuit.

This invention provides means for supplying a relatively low voltage to both the motor and the switching circuit, as well as for adjusting such low voltage to a desired value even in those cases where voltage differs quite widely from 115 volts, for example.

Some components, such as relays, coils, and solenoid valves operate satisfactorily from 115 volts D.C. Furthermore, they are relatively insentitive to the operating voltage. For example, some 115 volt D.C. relays will work quite satisfactorily on as much as 130 volts or as little as 70 volts. For this reason, such components are not included in the low voltage circuit, but instead are operated directly by the available source of voltage.

The invention provides an adjustable resistor in circuit relation capable of supplying usable voltage levels for torch switch current and wire inching. The resistor is connected as a potentiometer rather than as a series resistor because there will be some current passing through the potentiometer at all times regardless of whether the motor and other equipment actuated by the low voltage are energized or not. This tends to stabilize the low voltage so that it does not jump to a much higher voltage when the circuit is not loaded. A conventional series circuit will tend to go to the full source voltage as soon as the load is removed and this may result in damage to the motor or switch gear.

As shown in the drawing, there is provided sigma welding apparatus comprising a torch 10 provided with a reel 12 from which electrode wire 14 is drawn by feed rolls 16 driven by a motor 18. The motor 18 is connected in a circuit 20 including a protective fuse 22 and shunt-condenser 24. The torch includes a guide tube 26 through which arc welding current is transferred to the wire 14 by a welding current circuit 28 including a contactor 30 and work 32 from a suitable D.C. welding current source 34. Gas is supplied to the torch for discharge from a cup or nozzle 36 around the end portion of the electrode wire by a conduit 38 provided with a solenoid valve 40 having a control circuit 42 including a switch 44.

A weld-initiating or trigger switch 46 is associated with the torch. Such switch 46 is included in a welding initiating circuit 48 that also comprises a weld-start relay 50. An electrode wire inching circuit 54 is provided that includes inching switch 56, an adjustable resistor 58 for setting the inching speed, and the wire feed motor 18.

The control system for such sigma welding apparatus comprises an input circuit 60 provided with an on-off switch 62, 62, protective fuses 64, 66, and a pilot light 68. An adjustable voltage reducing resistor 70 may be included in lead 72 to a full-wave rectifier 74 which is connected by conductor 76 and 78 to a potentiometer 80 having a sliding contact or slider 82. A rheostat 84 is connected in series with the motor across the arc, while actually welding, for adjusting the wire feed speed, through circuit 86.

The invention also provides a novel relationship of the circuit elements such that it is impossible to simultaneously energize the wire feed motor with inching voltage and welding voltage, thus preventing serious damage to the system. The drawing is a circuit diagram of the invention.

When the control is properly connected for welding, the normal welding cycle is initiated by closing line switch 62, 62 (a double-pole single-throw switch). The purpose of gas switch 44 is to enable the arc shielding gas to be turned on automatically or manually. When the switch 44 is placed in position 88, gas solenoid valve 40 is continuously energized. This enables the operator to preset the gas flow without the need for energizing the welding contactor 30. During welding operations, gas switch 44 is set in position 90. Once torch switch 46 is actuated, weld start relay 50 is energized. Normally open contacts 49 and 51 of relay 50 close, thus energizing welding contactor 30 and gas solenoid valve 40.

When welding contactor 30 becomse energized, its contact 92 closes and energizes the welding circuit through welding lead 94. Normally closed contacts 96 and 98 of relay 50 open, and normally open contact 100 of relay 50 closes, thereby setting up the wire feed motor armature circuit 20 so that power to drive the motor 18 is obtained from welding circuit 34. Next, a welding arc A is established and causes the welding current to flow, energizing relay 102. Normally open contact 104 of relay 102 closes, completing armature circuit 20. The power to drive motor 18 is obtained from the welding circuit 34.

The potential that appears across the motor 18 is equal to or less than the voltage of the arc A between the end of wire electrode 14 and work 32. The speed of the wire feed motor 18 can be varied by means of the welding voltage rheostat 84. Varying the resistance from zero to maximum causes the wire feed motor 18 to run slower, and thereby reduces the amount of electrode wire 14 being fed into the arc A and the arc voltage increases. In a like manner, decreasing such resistance causes the arc voltage to decrease.

Releasing the torch switch 46 de-energizes relay 50, then closed contacts 49 and 51 of the relay 50 open, de-energizing welding contactor 30 and gas solenoid valve 40. When welding contactor 30 is de-energized, closed contact 92 opens, thus de-energizing the welding circuit 94. Closed contact 100 of relay 50 opens, and open contacts 96 and 98, respectively, of relay 50 close. Wire feed motor 18 becomes de-energized and electrode wire 14 ceases to feed into the welding zone. Relay 102 is de-energized because of the absence of welding current flowing in welding circuit 94 and, as a result, closed contact 104 of relay 102 opens. At this point, the control system is ready for re-cycling.

In order to insure operator safety, it is vital to maintain a low, i.e. safe, voltage on the torch trigger circuit. This could be accomplished with a step-down transformer. However, such a transformer can only function on an A.C. power source. Since such a source is not normally available to gasoline engine driven generators, another medium of voltage reduction had to be sought after. One way of accomplishing this end result is attained by locating a suitable resistance in proper circuit relation so that the 115 volt D.C. line voltage can be reduced to a safe voltage suitable for torch switch operation.

For wire inching purposes, as when it is desired to thread a new spool of wire through the torch, a low voltage is necessary to actuate the wire feed motor without energizing the welding circuit. If instead of a low voltage, 115 volts D.C. were applied, the motor would be damaged. To inch the wire electrically, it is necessary to have a voltage sufficiently low to apply to the wire feed motor.

The potentiometer 80 is located in circuit relation to provide means for reducing the 115 volt D.C. line voltage to a safe value for the torch trigger circuit 48 and for the inching circuit 54. To compensate for any difference in the voltage output in gasoline engine driven generators, potentiometer 80 is provided with the adjustable slider 82. This provides a relatively low voltage source necessary for the trigger switch and for the wire feed motor, for inching purposes. As a case in point, if the source voltage is 125 volts D.C., the voltage applied to the torch trigger circuit 48 would be higher than desirable. By means of suitable adjustment of slide 82, the proper voltage can be obtained for such use. In a like manner, if the source voltage is 100 volts D.C., reverse adjustment of slider 82 compensates for the voltage differential and the proper operating voltage is obtained.

When inch pushbutton 56 is actuated, wire feed motor 18 becomes energized and wire can be inched. The inching speed can be varied by adjusting resistor 58 such that the voltage applied to motor 18 will be lower than the voltage obtained from potentiometer. Such an arrangement is desirable when inching the wire preparatory to striking the arc.

By including the rectifier 74 ahead of the control wiring, as shown in the drawing, the control system is suitable for either A.C. or D.C. power. When the unit is connected to an A.C. power source, for example, the rectifier 74 delivers pulsating D.C. to points 76 and 78 in the circuit. For many components such pulsating power is satisfactory. In case the pulsations are bothersome, a condenser 110 is conected across points 76 and 78 to reduce the pulsations to a satisfactory value.

When the control is connected to a D.C. power source, the D.C. passes through the rectifier 74 with little effect except for a small voltage drop in the rectifier. The slider is adjusted to suit the available source of voltage. The rectifier makes the control insensitive to polarity and the motor operates in the correct direction regardless of polarity.

While such control is designed for operation from a 115 volt source, the slider adjustment 82 makes it possible to operate from a lower voltage source. This circuit is also operable from a higher voltage source by means of the resistance 70 inserted in leg 72 of the input circuit ahead of the rectifier 74. Such resistor 70 is adjusted to provide a desired voltage across the rectifier 74. Thus, an inexpensive rectifier of relatively low rating may be used.

What is claimed is:
1. Sigma welding apparatus comprising the combination with means for feeding an electrode wire toward work to be welded including a wire feed motor; means for conducting arc welding current to a welding circuit including a welding contactor, the end portion of such electrode wire and the work; means for supplying arc shielding gas around such electrode wire end portion including a welding torch and a gas solenoid valve; a weld initiating control circuit including a weld initiating switch and a weld start relay; and an electrode wire inching circuit including an inching switch, an adjustable resistor and said wire feed motor; of a weld control system therefore comprising an input circuit adapted to be connected to a source of electric power selected from the class consisting of A.C. and D.C., a potentiometer circuit energized by such power source for applying a suitable voltage different from that of said source to said inching circuit and said wire feed motor and to said weld initiating circuit; and means for applying a relatively higher voltage derived from such source to said welding contactor and said gas solenoid valve.

2. Sigma apparatus as defined by claim 1 including means for transferring said motor from said potentiometer circuit to said welding circuit in response to energization of said weld start relay.

3. Sigma welding apparatus as defined by claim 2 including means for applying the arc welding voltage to said motor as soon as the welding arc is initiated.

4. Metal arc welding apparatus comprising the combination with means for feeding an electrode wire toward work to be welded including a wire feed motor; means for conducting arc welding current to a welding circuit including a welding contactor, the end portion of such electrode wire and the work; a weld initiating control circuit including a weld initiating switch and a weld start relay; and an electrode wire inching circuit including an inching switch, an adjustable resistor and said wire feed motor; of a weld control system therefore comprising an input circuit adapted to be connected to a source of electric power selected from the class consisting of A.C. and D.C., a potentiometer circuit energized by such power source for applying a suitable voltage different from that of said source to said inching circuit and said wire feed motor and to said weld initiating circuit; and means for applying a relatively higher voltage derived from said source to said welding contactor.

References Cited in the file of this patent
UNITED STATES PATENTS

| | | |
|---|---|---|
| 2,510,204 | Baird | June 6, 1950 |
| 2,654,015 | Landis | Sept. 29, 1953 |
| 2,843,727 | Benz | July 15, 1958 |
| 2,897,342 | Bichsel | July 28, 1959 |
| 3,021,420 | Ruland et al. | Feb. 13, 1962 |

FOREIGN PATENTS

| | | |
|---|---|---|
| 733,667 | Great Britain | July 13, 1955 |